United States Patent
Epaud et al.

(10) Patent No.: US 11,623,547 B2
(45) Date of Patent: Apr. 11, 2023

(54) VEHICLE SEAT

(71) Applicant: FAURECIA Sièges d'Automobile, Nanterre (FR)

(72) Inventors: David Epaud, Lardy (FR); Farouk Bouzid, Bretigny sur Orge (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 252 days.

(21) Appl. No.: 17/036,684

(22) Filed: Sep. 29, 2020

(65) Prior Publication Data
US 2021/0094445 A1 Apr. 1, 2021

(30) Foreign Application Priority Data
Sep. 30, 2019 (FR) ...................................... 1910839

(51) Int. Cl.
*B60N 2/12* (2006.01)
*B60N 2/14* (2006.01)
*B60N 2/24* (2006.01)
*B60N 2/015* (2006.01)
*B60N 2/07* (2006.01)
*B60N 2/20* (2006.01)
*B60N 2/68* (2006.01)

(52) U.S. Cl.
CPC .............. *B60N 2/24* (2013.01); *B60N 2/015* (2013.01); *B60N 2/0735* (2013.01); *B60N 2/12* (2013.01); *B60N 2/14* (2013.01); *B60N 2/20* (2013.01); *B60N 2/682* (2013.01); *B60N 2002/684* (2013.01)

(58) Field of Classification Search
CPC ................................... B60N 2/12; B60N 2/14
See application file for complete search history.

(56) References Cited

U.S. PATENT DOCUMENTS 8,833,853 B2 * 9/2014 Kim ..................... B60N 2/2362
   297/316
10,829,014 B2 * 11/2020 Sivaraj ..................... B60N 2/36
(Continued)

FOREIGN PATENT DOCUMENTS

DE    102013003790 B3 *  2/2014  ............... B60N 2/06
DE    102019216333 A1 *  4/2021
WO    2008093197 A1      8/2008

OTHER PUBLICATIONS

French Search Opinion for FR1910839 dated May 18, 2020, BET1200225 FR, 9 pages, No English translation available.

*Primary Examiner* — Timothy J Brindley
(74) *Attorney, Agent, or Firm* — Barnes & Thornburg LLP

(57) ABSTRACT

A vehicle seat configured to accommodate at least two users, comprising a base, and a seating portion frame comprising at least two seating areas, a first and a second backrest which are pivotally hinged to the base, wherein the seat further comprises a connection system connecting the first backrest to the seating portion frame, configured so that the pivoting of the first backrest relative to the base causes the simultaneous movement of the seating portion frame relative to the base, and wherein the second width portion of the seating portion frame is connected to the base, by means of a connection mechanism, configured to enable movement of the seating portion frame relative to the base during the movement of the seating portion frame relative to the base.

13 Claims, 8 Drawing Sheets

(56) References Cited

U.S. PATENT DOCUMENTS

| | | | |
|---|---|---|---|
| 11,351,897 B2* | 6/2022 | Epaud | B60N 2/1615 |
| 2012/0228910 A1* | 9/2012 | Kim | B60N 2/1842 297/257 |
| 2020/0180474 A1* | 6/2020 | Moon | B60N 2/3093 |

* cited by examiner

VEHICLE SEAT

PRIORITY CLAIM

This application claims priority to French Application No. FR 19 10839, filed Sep. 30, 2019, which is expressly incorporated by reference herein.

BACKGROUND

The present disclosure relates a seat for a vehicle, configured to accommodate at least two users, and in particular for a motor vehicle, as well as a vehicle equipped with such a seat. The present disclosure relates to the field of vehicle seats configured to accommodate at least two users, in particular those which are part of a vehicle bench seat, which generally comprises one or more seats and is intended to accommodate several users seated side by side, the bench seats being able to assume different configurations.

SUMMARY

According to the present disclosure, a vehicle seat is configured to accommodate at least two users, able to assume different configurations, for which the forces received by the seating portion frame can be absorbed at its rear edge over its entire width, so as to improve its strength and stability.

In illustrative embodiments, a vehicle seat is configured to accommodate at least two users, comprising:

a lower frame, intended to be connected to the floor of a vehicle, for example by means of connection means comprising in particular sliders, having:

a base, intended to be connected to the floor of the vehicle, for example by means of connection means, and a seating portion frame, comprising at least two seating areas to accommodate at least two users, having a front edge and a rear edge interconnected by a first side edge and a second side edge, a first backrest hinged to the base of the lower frame about a first transverse axis of the seat, extending along a first width portion of the seating portion frame in the transverse direction of the seat, and configured to pivot relative to the base about the first transverse axis between at least one raised position and a folded position, a second backrest hinged to the base of the lower frame so as to pivot about a second transverse axis of the seat, able in particular to be coincident with the first transverse axis, the second backrest extending along a second width portion of the seating portion frame in the transverse direction of the seat, and configured to pivot relative to the base about the second transverse axis between at least one raised position and a folded position.

In illustrative embodiments, the seat further comprises a connection system connecting the first backrest to the seating portion frame, configured so that the pivoting of the second backrest relative to the base about the first transverse axis between the at least one raised position and the folded position causes the simultaneous movement of the seating portion frame relative to the base in the longitudinal direction and the vertical direction between a first position and a second position, in the two pivoting directions of the first backrest relative to the base, about the first transverse axis of the seat.

In illustrative embodiments, the second backrest is configured to pivot relative to the base about the second transverse axis between the at least one raised position and the folded position, independently of the movement of the seating portion frame relative to the base in the longitudinal direction and the vertical direction, driven, by means of the connection system, by the pivoting of the first backrest relative to the base about the first transverse axis, at least to enable the second backrest to be folded from the at least one raised position to the folded position with the second backrest remaining in the raised position, and without causing the simultaneous movement of the seating portion frame relative to the base.

In illustrative embodiments, the second width portion of the seating portion frame is connected to the base, at the rear edge of the seating portion frame, by means of a connection mechanism, configured to enable movement of the seating portion frame relative to the base in the longitudinal direction and the vertical direction of the seat during the movement of the seating portion frame relative to the base in the longitudinal direction and the vertical direction of the seat.

In illustrative embodiments, the connection mechanism comprises a connecting rod having two longitudinal ends with:

a first longitudinal end hinged to the seating portion frame at its rear edge so as to pivot about a third transverse axis of the seat, and a second longitudinal end hinged to the base so as to pivot about a fourth transverse axis of the seat and movable relative to the base so as to slide along a translation axis.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

For the most part, the drawings and the description below contain elements which are certain in nature. Therefore not only can these serve to provide a better understanding of the present disclosure, they can also contribute to its definition, where appropriate.

Figure 1:
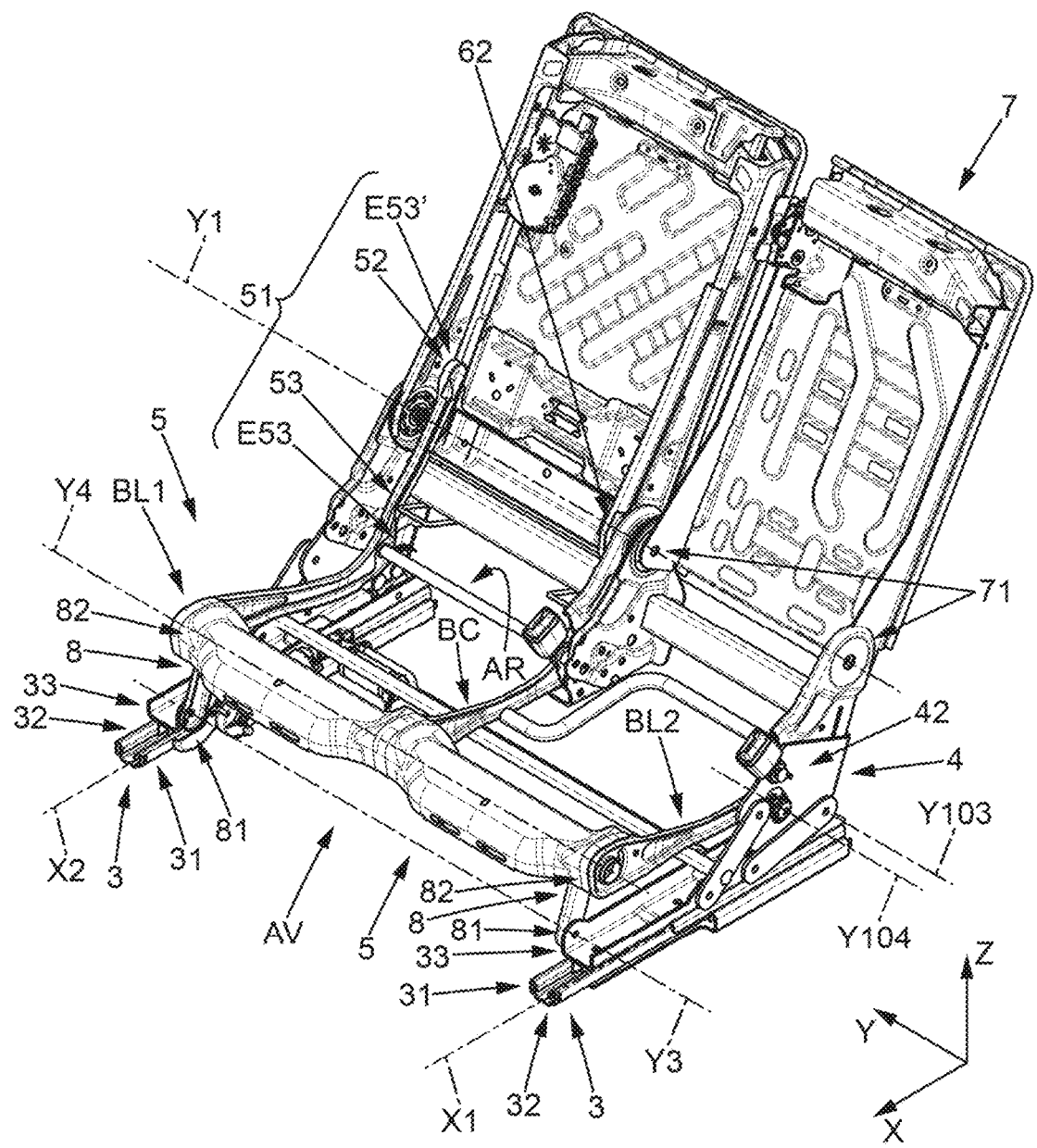
FIG. 1 shows a perspective view of a vehicle seat according to one embodiment of the present disclosure, in a first configuration.
Figure 6:
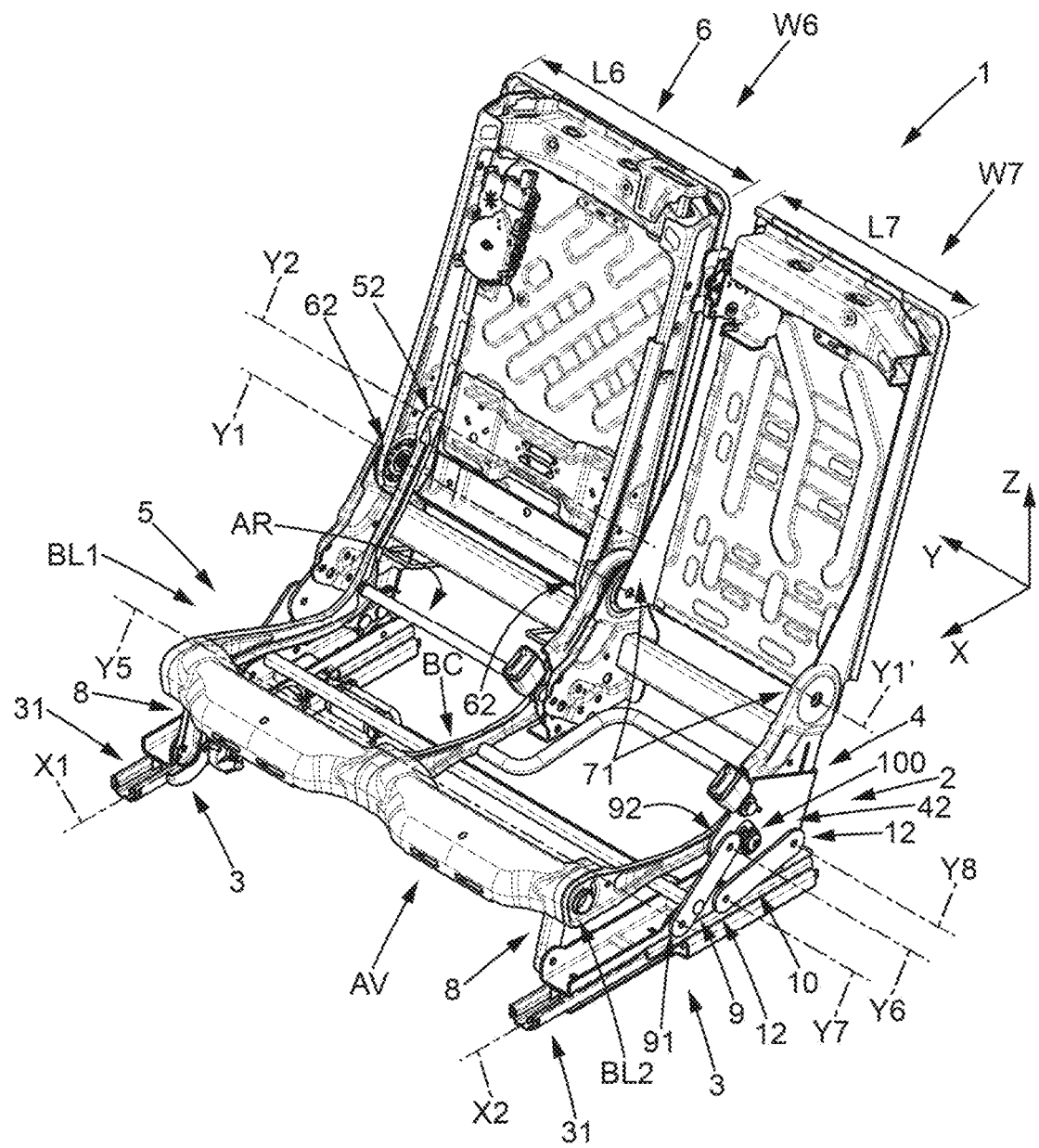
FIG. 6 shows a perspective view of the seat of FIG. 1, in a second configuration.

Throughout this application, the spatial directions are defined as follows:

the longitudinal direction X of the seat corresponds to the sliding direction of the seat relative to the floor of the vehicle along sliders, when the seat comprises sliders as means for anchoring to the floor of the vehicle, received on the lower frame of the seat, as represented in the exemplary embodiments of FIGS. 1 and 6, the vertical direction Z of the seat corresponds to the direction perpendicular to the plane of the floor of the vehicle to which the seat is fixed, also perpendicular to the longitudinal direction of the seat, defined above, as represented in the exemplary embodiments of FIGS. 1 and 6, the transverse direction Y of the seat is the direction perpendicular to the longitudinal direction and to the vertical direction, as represented in the exemplary embodiments of FIGS. 1 and 6.

Similarly, a plane of the seat is defined according to the directions of the seat it contains.

An axis is defined as a straight line along a determined direction, and possibly directional. For example, a longitudinal axis is an axis along the longitudinal direction.

Also, front and rear are understood in relation to the longitudinal direction of the seat, with an orientation from the rear edge of the lower frame, where a seat backrest is hinged, towards the front edge of the lower frame.

Similarly, upper and lower are understood in relation to the vertical direction of the seat, with an orientation from the connection means, and in particular the sliders, towards the backrest of the seat.

Finally, throughout the present application, substantially longitudinal, transverse, or vertical, is understood to mean an orientation relative to the longitudinal direction, vertical direction, or transverse direction, with an angle of less than 30° which may advantageously be zero.

Similarly, substantially parallel is understood to mean an orientation relative to a given element, with an angle of less than 30° which may advantageously be zero.

The present disclosure relates to a vehicle seat 1 configured to accommodate at least two users, comprising:

a lower frame 2, intended to be connected to the floor of a vehicle, for example by connection means comprising in particular sliders, having:

a base 4, intended to be connected to the floor of the vehicle, for example by connection means 3 comprising in particular sliders 31, and a seating portion frame 5 comprising at least two user places to accommodate at least two users, having a front edge AV and a rear edge AR interconnected by a first side edge BL1 and a second side edge BL2, a first backrest 6 hinged to the base 4 of the lower frame 2 so as to pivot about a first transverse axis Y1 of the seat 1, extending along a first width portion W6 of the seating portion frame 5 in the transverse direction Y of the seat 1, and configured to pivot relative to the base 4 about the first transverse axis Y1 between at least one raised position and a folded position, a second backrest 7 hinged to the base 4 of the lower frame 2 so as to pivot about a second transverse axis Y1' of the seat 1, able in particular to be coincident with the first transverse axis Y1, the second backrest 7 extending along a second width portion W7 of the seating portion frame 5 in the transverse direction Y of the seat 1, and configured to pivot relative to the base 4 about the second transverse axis Y1' between at least one raised position and a folded position.

According to the present disclosure, the seat 1 further comprises a connection system 51 connecting the first backrest 6 to the seating portion frame 5, configured so that the pivoting of the first backrest 6 relative to the base 4 about the first axis transverse Y1 between the at least one raised position and the folded position causes the simultaneous movement of the seating portion frame 5 relative to the base 4 in the longitudinal direction X and the vertical direction Z between a first position and a second position, in the two pivoting directions of the first backrest 6 relative to the base 4, about the first transverse axis Y1 of the seat 1.

According to the present disclosure, the second backrest 7 is configured to pivot relative to the base 4 about the second transverse axis Y1', independently of the movement of the seating portion frame 5 relative to the base 4 in the longitudinal direction X and the vertical direction Z, driven, by means of the connection system 51, by the pivoting of the first backrest 6 relative to the base 4 about the first transverse axis Y1, at least to enable the second backrest 7 to be folded from the at least one raised position to the folded position with the first backrest 6 remaining in the raised position, and without causing the simultaneous movement of the seating portion frame 5 relative to the base 4.

According to the present disclosure, the second width portion W7 of the seating portion frame 5 is connected to the base 4, at the rear edge AR of the seating portion frame 5, by means of a connection mechanism 100 configured to enable movement of the seating portion frame 5 relative to the base 4 in the longitudinal direction X and the vertical direction Z of the seat 1 during the movement of the seating portion frame 5 relative to the base 4 in the longitudinal direction X and the vertical direction Z of the seat 1.

According to the present disclosure, the connection mechanism 100 comprises a connecting rod 101 having two longitudinal ends 102, 103 with:

a first longitudinal end 102 hinged to the seating portion frame 5 at its rear edge AR, so as to pivot about a third transverse axis Y102 of the seat 1, and a second longitudinal end 103 hinged to the base 4 so as to pivot about a fourth transverse axis Y103 of the seat 1 and movable relative to the base 4 so as to slide along a translation axis A104.

The rear edge AR is obviously understood to mean any element of the seating portion frame 5 positioned at the rear edge AR of the seating portion frame 5, whether it is for example a crossmember connected to the first BL1 or second BL2 side edge of the seating portion frame 5, or even an element integral with the first BL1 or second BL2 side edge, at the rear edge AR of the seating portion frame 5.

Thus, with the seat 1 according to the present disclosure, the forces received by the seating portion frame 5, and in particular at its rear edge AR, are absorbed along its entire width, so that no part of the frame seat 5 is cantilevered relative to another.

Also, unlike a connection between the second width portion W7 of the seating portion frame 5 and the base 4 at its rear edge AR, which would be a simple hinge pivoting about a transverse axis of the seat 1 or else a rigid connection, the connection mechanism 100 allows movement of the seating portion frame 5 relative to the base 4 in the longitudinal direction X and the vertical direction Z of the seat 1, without causing movement of the second backrest 7 relative to the base 4.

Figure 3:
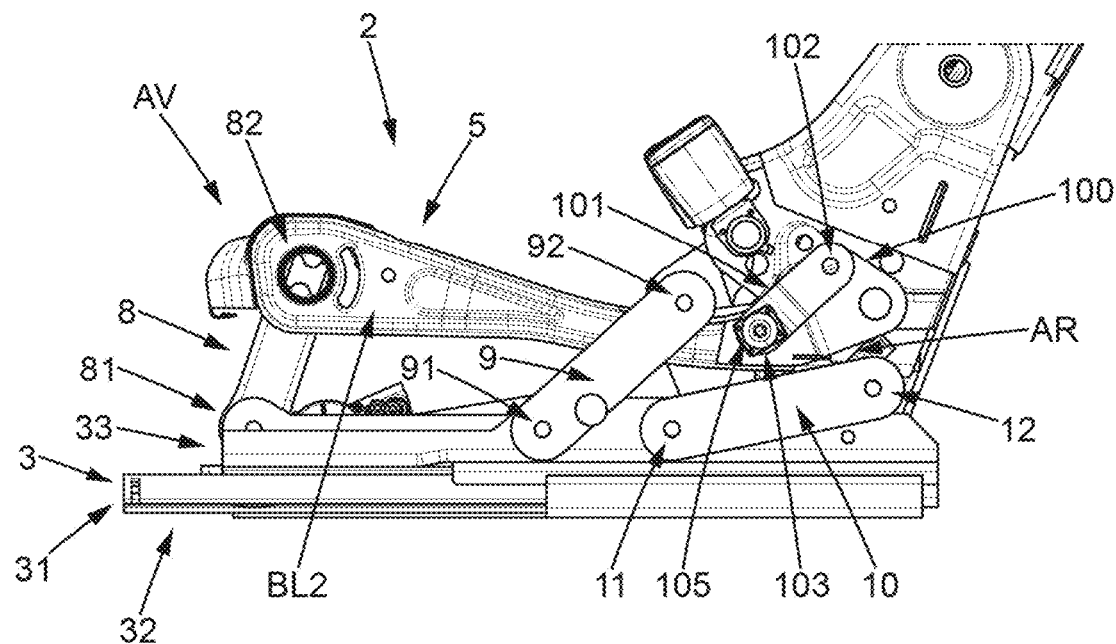
FIG. 3 shows a detailed side view of the seat of FIG. 1, in which an element of the base has been removed.

Advantageously, and as can be seen in the exemplary embodiments of FIGS. 1 and 3, the connection mechanism 100 is therefore not connected to the second backrest 7, to ensure that the pivoting of the second backrest 7 relative to the base 4 about the second transverse axis Y1 of the seat 1 is independent of and decoupled from the movement of the seating portion frame 5 relative to the base 4 in the longitudinal direction X and the vertical direction Z of the seat 1.

The connection system 51 may in particular connect only the first backrest 6 to the seating portion frame 5, and in particular to the first width portion W6 of the seating portion frame 5, no connection then existing between the second backrest 7 and the seating portion frame 5.

Due to the connection mechanism 100 of the seat 1 according to the present disclosure, and as can be seen more particularly in the embodiments of FIGS. 1 and 6 to 10, the forces received by the seating portion frame 5 can be absorbed at its rear edge AR substantially along its entire width, in the transverse direction Y of the seat 1, partly by the first backrest 6, by means of the connection system 51 connecting the first width portion W6 of the seating portion frame 5 to the first backrest 6, and partly by the connection mechanism 100 connecting the second width portion W7 to the seating portion frame 5.

No portion of the seating portion frame 5 is cantilevered relative to another, which enables it to provide stability and reduces the risk of damage from the effect of the forces received.

Advantageously, and as can be seen in the exemplary embodiments of FIGS. 1 and 6, the first transverse axis Y1 where the first backrest 6 pivots relative to the base 4 may be coincident with the second transverse axis Y1' where the second backrest 7 pivots relative to the base 4.

Alternatively, and without departing from the scope of the present disclosure, the first transverse axis Y1 and the second transverse axis Y1' could be distanced from one another.

According to one embodiment, the second backrest 7 is connected to the base 4 by means of a connection system 71, configured so that the movement of the second backrest 7 relative to the base 4 is independent of and decoupled from the movement of the seating portion frame 5 relative to the base 4.

To this end, and as can be seen for example in the embodiments of FIGS. 1 and 6, the connection system 71 may for example only comprise a pivoting connection along the second transverse axis Y1' of the seat 1, between the second backrest 7 and the base 4.

Thus, the second backrest 7 is connected to the base 4 solely by means of the connection system 71 and is therefore entirely decoupled from the seating portion frame 5, such that the movement of the second backrest 7 relative to the base 4 does not cause movement of the seating portion frame 5 relative to the base 4.

Advantageously, the pivoting connection between the second backrest 7 and the base 4 about the second transverse axis Y1' of the seat 1 may incorporate an electric actuator, in particular an electric motor, configured to cause the second backrest 7 to pivot relative to the base 4 about the second transverse axis Y1' of the seat 1.

The pivoting connection between the second backrest 7 and the base 4 about the second transverse axis Y1' of the seat 1 may further comprise a locking means, advantageously integrated into the pivoting connection, or even integrated into the electric actuator, and configured to lock the tilt of the second backrest 7 relative to the base 4 about the second transverse axis Y1'.

Figure 2:
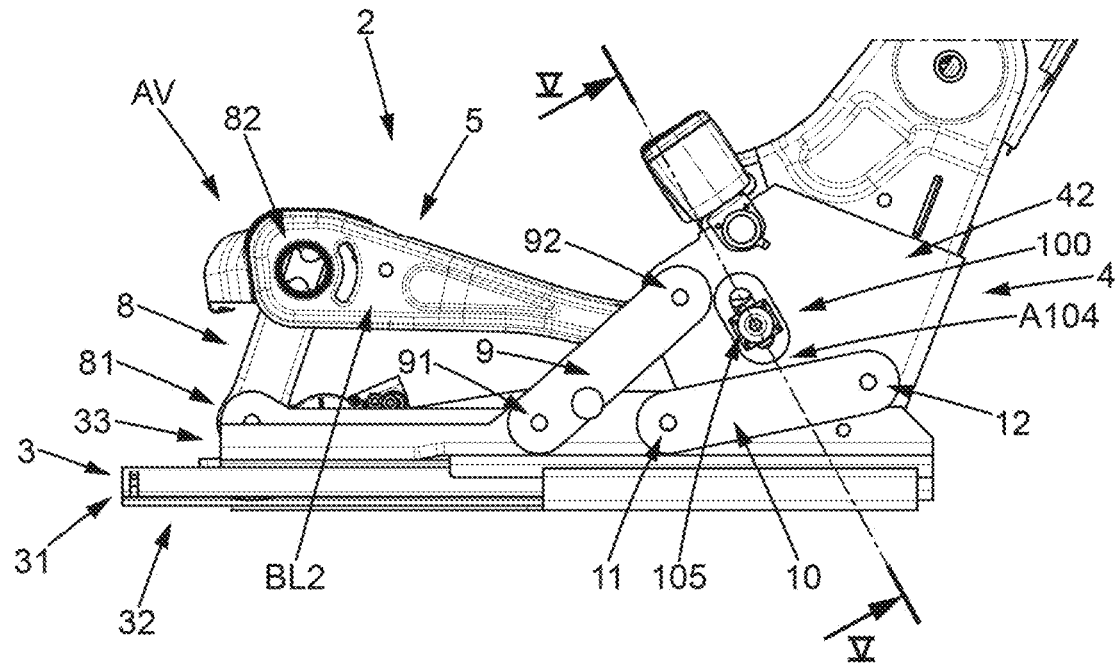
FIG. 2 shows a detailed side view of the seat of FIG. 1.
Figure 4:
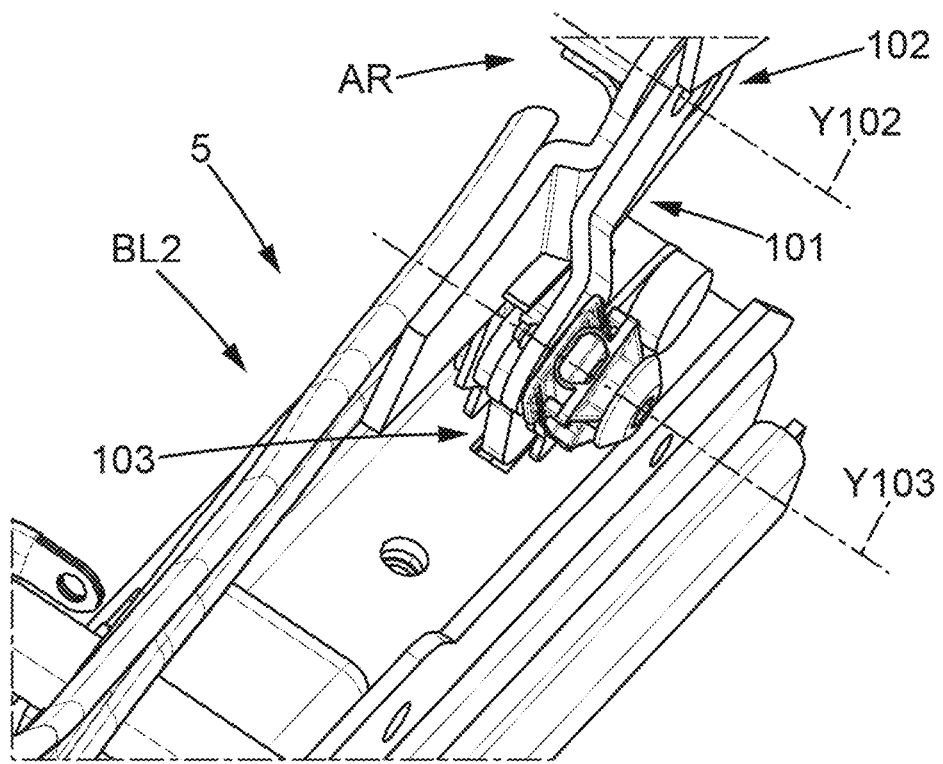
FIG. 4 shows a detailed perspective view of the seat of FIG. 1, in which an element of the base has been removed.

Additionally or alternatively, a means may be provided for locking the tilt of the second backrest 7 relative to the base 4 about the second transverse axis Y1', actuated manually or electrically, configured to lock the tilt of the second backrest 7 relative to the base 4 about the second transverse axis Y1', by creating a rigid connection between the second backrest 7 and the frame of the vehicle. Also, such a design of the connection mechanism 100, visible for example in the exemplary embodiments of FIGS. 2 to 4, is particularly simple and of reduced production cost.

The connection mechanism 100 thus allows at least two degrees of freedom between the seating portion frame 5 and the base 4 in order to enable the movement of the seating portion frame 5 relative to the base 4 in the longitudinal direction X and the vertical direction Z of the seat 1.

As can be seen in the embodiments of FIGS. 1 and 6 to 8, it is possible, by means of the seat 1 according to the present disclosure, to conceive of different configurations for the seat 1 and for a bench seat comprising the seat 1 according to the present disclosure.

In particular, a first so-called nominal configuration may be provided, which can be seen for example in the embodiment of FIG. 6, in which the first backrest 6 and the second backrest 7 are in their raised position, in other words a position in which the first backrest 6 and the second backrest 7 are oriented in a direction substantially parallel to the vertical direction Z of the seat 1, and the seating portion frame 5, and in particular its front edge AV, is at a distance from the floor of the vehicle with an orientation in a direction substantially parallel to the longitudinal direction X of the seat 1, the seating portion frame 5 being in the first position.

Such a nominal configuration is provided to enable the seat 1 to receive at least two users in a seated position, side by side on the seat 1.

Figure 7:
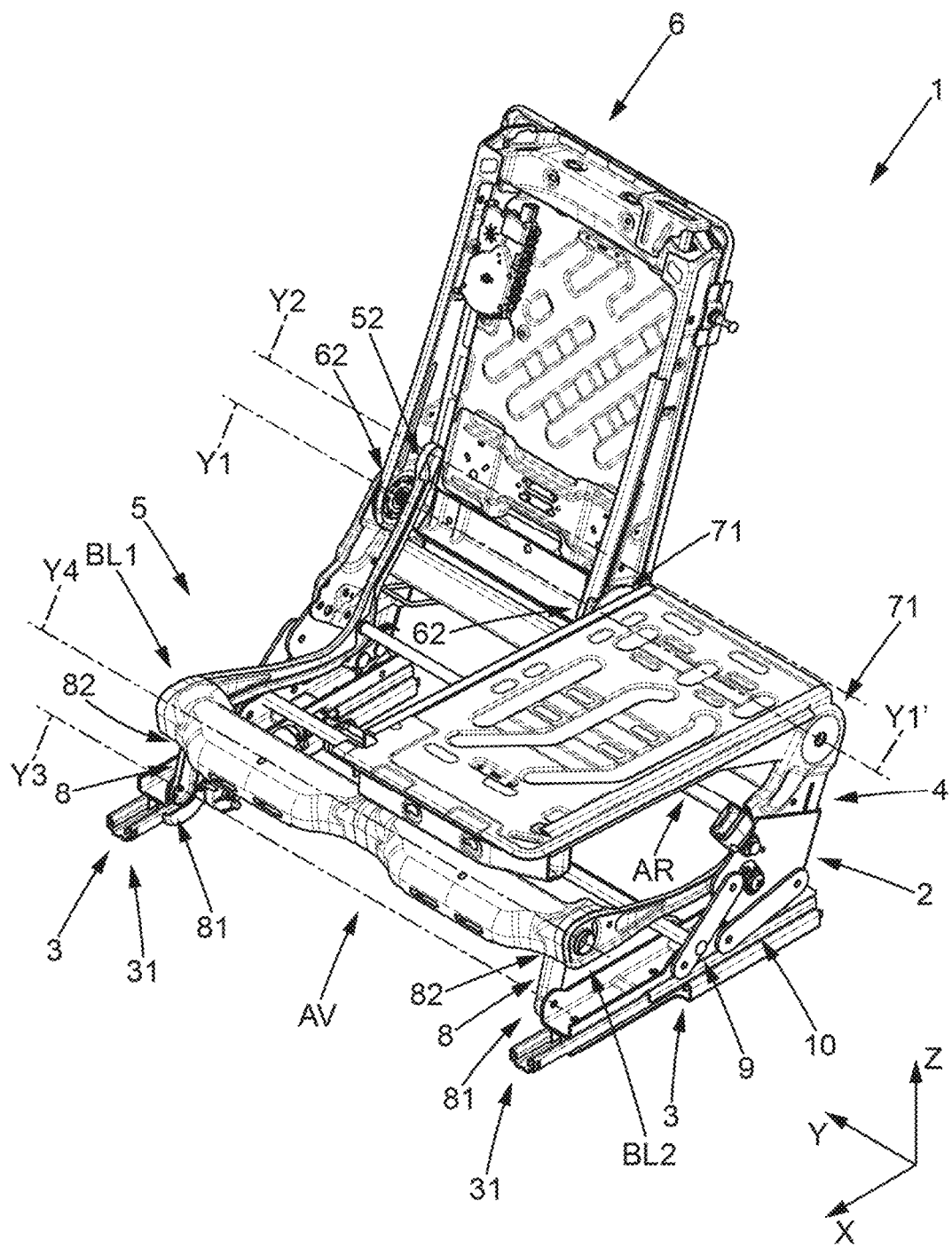
FIG. 7 shows a perspective view of the seat of FIG. 1, in a third configuration.

A second configuration may also be provided, called single fold, visible for example in the embodiment of FIG. 7, in which only the first backrest 6 is in its raised position while the second backrest 7 is in its folded position, in other words a position in which the second backrest 7 is brought close to the seating portion frame 5 so as to be oriented in a direction substantially parallel to the longitudinal direction X of the seat 1, while the seating portion frame 5, and in particular its front edge AV, remains distanced from the means of the vehicle floor with an orientation substantially parallel to the longitudinal direction X of the seat 1, in the first position.

The pivoting of the second backrest 7 relative to the base 4 about the second transverse axis Y1', between its raised position and its folded position, did not cause movement of the seating portion frame 5 relative to the base 4, the connection system 51 advantageously not being connected to the second backrest 7, as can be seen more particularly in the embodiments of FIGS. 1 and 6 to 10.

Such a single fold configuration may be provided in the case where the bench seat receiving the seat 1 defines a separation between the trunk of the vehicle and the passenger compartment of the vehicle receiving the bench seat, and it is necessary to provide access between the trunk and the passenger compartment, for example to be able to transport long objects, such as wood boards or skis, which are placed in the trunk but protrude into the passenger compartment, this access being provided at the second backrest 7 while enabling at least one user to sit on the bench seat, by being received on the lower frame 2 and on the first backrest 6.

Figure 8:
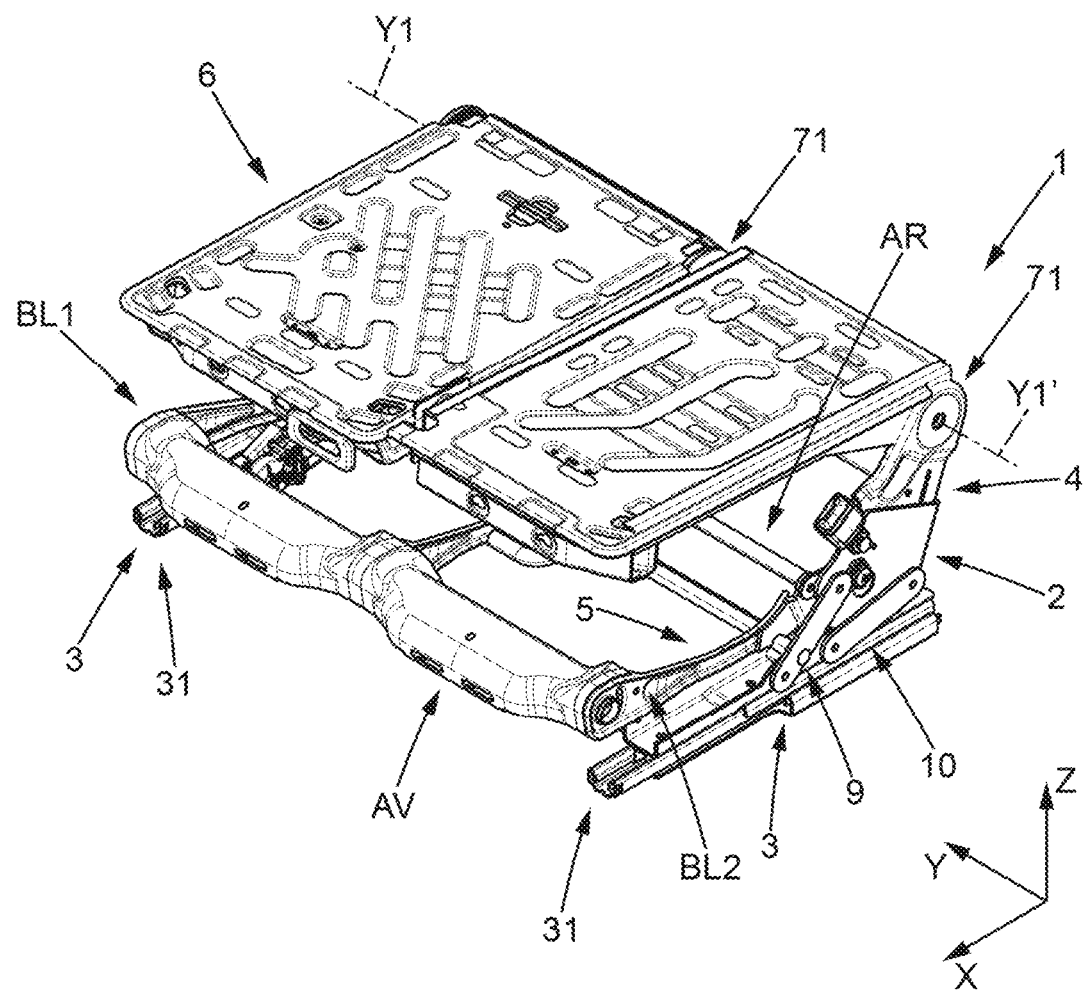
FIG. 8 shows a perspective view of the seat of FIG. 1, in a fourth configuration.

A third configuration may also be provided, called dive down, visible for example in the embodiment of FIG. 8, in which the first backrest 6 and the second backrest 7 are both in their folded position, in other words a position in which the first backrest 6 and the second backrest 7 are brought close to the seating portion frame 5 so as to be oriented in a direction substantially parallel to the longitudinal direction X of the seat 1, while the seating portion frame 5, and in particular its front edge AV, is brought closer to the floor of the vehicle in comparison to the nominal and single fold configurations, while being tilted relative to the longitudinal direction X of the seat. The seating portion frame 5 is then in the second position, having been driven by the first backrest 6 via the connection system 51.

Such a dive down configuration makes it possible for example to increase the effective cargo volume in the vehicle receiving the bench seat with the seat 1 according to the present disclosure, and without any user being able to sit on the seat 1.

With the seat 1 according to the present disclosure, to transition from the nominal configuration to the single fold configuration, it is sufficient to rotate the second backrest 7 relative to the base 4 about the first transverse axis Y1 of the seat 1, for example by means of manual action by a user or else by means of an actuator, for example an electric motor.

Also, with the seat 1 according to the present disclosure, to transition from the nominal configuration to the dive down configuration, it is sufficient to rotate only the first backrest 6 relative to the base 4 about the first transverse axis Y1 of the seat 1, for example by means of manual action by a user or else by means of an actuator, for example an electric motor, so as to bring it closer to its folded position, which causes, by means of the connection system 51, movement of the seating portion frame 5 relative to the base 4 from the first position to the second position, and without causing the second backrest 7 to pivot relative to the base 4 about the second transverse axis Y1', which must then be driven simultaneously or subsequently, for example by means of manual action by a user or else by means of an actuator, for example an electric motor.

In a similar manner, with the seat 1 according to the present disclosure, it is possible to transition from the single fold configuration to the dive down configuration by pivoting only the first backrest 6 relative to the base 4 about the first transverse axis Y1 of the seat 1, for example by means of manual action of a user or else by means of an actuator, for example an electric motor, so as to bring it closer to its folded position, which simultaneously causes, by means of the connection system 51, movement of the seating portion frame 5 relative to the base 4 from the first position to the second position, and without causing the second backrest 7 to pivot relative to the base 4 about the second transverse axis Y1', the latter not being connected to the connection system 51.

As can be seen in the embodiment of FIG. 1, a fourth configuration may be provided, called the comfort configuration, in which at least the first backrest 6, and advantageously the second backrest 7, are tilted back relative to their raised position, by an angle of between 10° and 30°, for example substantially equal to 15°, and in which the front edge AV of the seating portion frame 5 is offset rearward along the longitudinal direction X of the seat 1, relative to the first position of the seating portion frame 5, while remaining distanced from the floor of the vehicle.

This configuration makes it possible to offer at least one of the two users of the seat 1 according to the present disclosure a position in which the user is more reclined backward than in the nominal configuration, which offers increased comfort.

With the seat 1 according to the present disclosure, to transition from the nominal configuration to the comfort configuration, it is sufficient to pivot the first backrest 6 relative to the base 4 about the first transverse axis Y1 of the seat 1, rearward relative to its raised position, for example by means of manual action by a user or else by means of an actuator, for example an electric motor, which causes, by means of the connection system 51, the rearward movement of the seating portion frame 5 relative to the base 4 along the longitudinal direction X of the seat 1, from the first position, and without causing the second backrest 7 to pivot relative to the base 4 about the second transverse axis Y1', it not being connected to the connection system 51. It is then necessary to cause the second backrest 7 to pivot relative to the base 4, about the second transverse axis Y1', simultaneously or subsequently, for example by means of manual action of a user or else by means of an actuator, such as an electric motor.

In at least each of these configurations, the forces received by the seating portion frame 5, at its rear edge, are absorbed over its entire width, in part by the first backrest 6 via the connection system 51, and in part by the base 4 via the connection mechanism 100.

The connection system 100 also makes it possible to switch from one configuration to another by enabling movement of the seating portion frame 5 relative to the base 4, without causing the first backrest 6 or the second backrest 7 to pivot relative to the base 4.

In particular, for this purpose, the connection mechanism 100 may be configured so that, during movement of the seating portion frame 5 relative to the base 4 in the longitudinal direction X and in the vertical direction Z of the seat 1, caused by the pivoting of the first backrest 6 relative to the base 4 about the first transverse axis Y1:

the connecting rod 101 pivots relative to the seating portion frame 5 at its first longitudinal end 102, about the third transverse axis Y102, the connecting rod 101 pivots relative to the base 4 at its second longitudinal end 103, about the fourth transverse axis Y103, the second longitudinal end 103 of the connecting rod 101 slides relative to the base 4 along the translation axis A104.

According to one embodiment, the first longitudinal end 102 is hinged on a side edge BL1, BL2 of the seating portion frame 5 so as to pivot about the third transverse axis Y102 of the seat 1.

According to one embodiment, as can be seen in the exemplary embodiments of FIGS. 1 and 2, the sliding axis A104 may advantageously be contained in a plane parallel to the plane (XZ) of the seat 1 and preferably inclined relative to the longitudinal X and/or vertical Z directions of the seat 1, in particular in the case where the base 4 is attached to the floor of the vehicle.

The inclination of the translation axis A104 relative to the longitudinal X and vertical Z directions of the seat 1 as well as the stroke that the second longitudinal end 103 of the connecting rod 101 can travel along the translation axis A104 may advantageously be determined as a function of the different possible movements of the seating portion frame 5 relative to the base 4, possibly combined with the different possible movements of the base 4 relative to the floor of the vehicle.

The base 4 may then have a hole 104 oriented along the translation axis A104.

The hole 104 may for example be implemented in the form of a through-hole, or of a non-piercing groove.

Advantageously, the second longitudinal end 103 of the connecting rod 101 may then be connected to the base 4 via a guide pin 105, received in the hole 104 and configured to slide in the hole 104 along the translation axis A104.

The hole 104 may advantageously be provided as substantially rectilinear, as can be seen in the embodiment of FIG. 2, and extend in the direction of the translation axis A104.

Advantageously, the hole 104 may be made directly in the base 4, for example on a side flange 42 of the base, as visible in the embodiments of FIGS. 1, 2 and 6.

According to one embodiment, the hole 104 is of substantially rectangular or oblong shape.

The guide pin 105 advantageously may then have a longitudinal slide-guiding portion 106 received in the hole 104, the hole 104 having a substantially rectangular cross-section.

Figure 5:
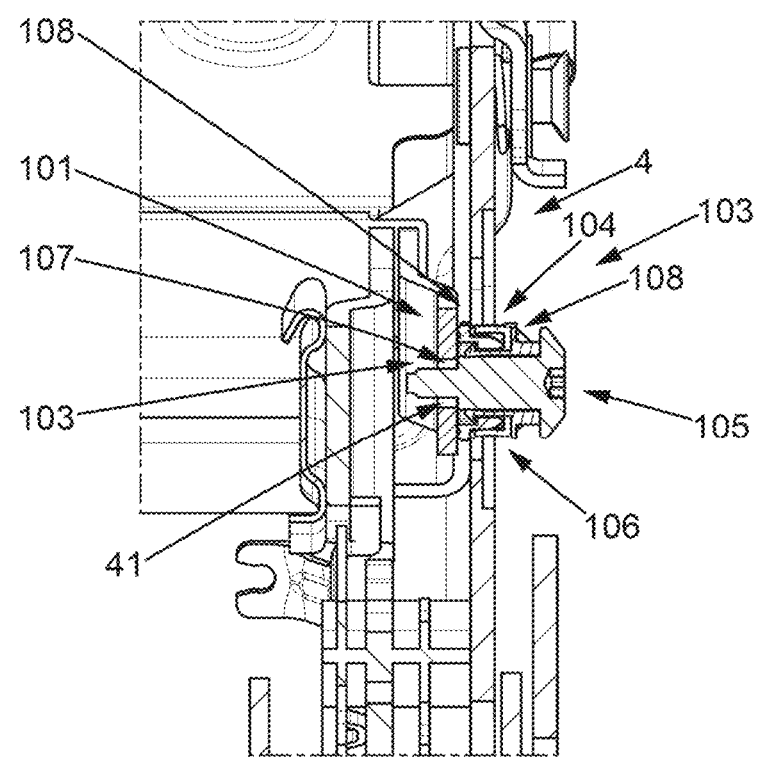
FIG. 5 shows a detailed section view along line V-V of FIG. 2 of the seat of FIG. 1.

Advantageously, and as can be seen more particularly in the exemplary embodiment of FIG. 5, the longitudinal slide-guiding portion 106 may have a width substantially equal to the width of the hole 104, excluding the sliding clearance.

Also, in order to prevent the movement of the longitudinal guide portion 106 of the guide pin 105, or of the entire guide pin 105, relative to the base 4, and possibly relative to the connecting rod 101, along the transverse direction Y of the seat 1, the guide pin 105 may also include two stop walls 108, positioned one on either side of the longitudinal slide-guiding portion 106, and configured to prevent the movement of the longitudinal slide-guiding portion 106, or of the guide pin 105 as a whole, relative to the base 4 and possibly relative to the connecting rod 101, along the transverse direction Y of the seat 1.

In particular, and for this purpose, the stop walls may be provided with a width strictly greater than the width of the hole 104.

The stop wall 108 and/or the longitudinal slide-guiding portion 106 may be provided, at least in part, as one piece with and integral with the guide pin 105, or alternatively, in order to facilitate the manufacture of the guide pin 105 or even facilitate its disassembly, for example for maintenance, they may be provided, at least in part, as elements separate from the guide pin 105, or even removable from the guide pin 105.

As can still be seen in the embodiment of FIG. 5, the guide pin 105 may also include a rotation-guiding portion 107, in particular of substantially cylindrical shape and of substantially circular cross-section, designed to be received so as to pivot about the fourth transverse axis Y103 of the seat 1, in a housing 41 of corresponding substantially cylindrical shape, formed in the connecting rod 101 at the second longitudinal end 103 of the connecting rod 101.

Also, the connecting rod 101 may be hinged at its first longitudinal end 102 by means of a pin (not shown), physically representing the third transverse axis Y102, and having for example a threaded portion to allow its attachment to the second side edge BL2 of the seating portion frame 5.

According to one embodiment, the connection system 51 between the first backrest 6 and the seating portion frame 5 comprises a pivoting connection 52 on a fifth transverse axis Y2 of the seat 1, distinct from the first transverse hinging axis Y1 between the first backrest 6 and the base 4, connecting the first backrest 6 and the seating portion frame 5, near its rear edge AR.

Thus, the forces received by the seating portion frame 5 at its rear edge AR are partly absorbed, for the first width portion W6, by the first backrest 6 which is hinged to the seating portion frame 5 by means of the at least one pivoting connection 52.

However, as the at least one pivoting connection 52 is positioned only at the first backrest 6, the rear edge AR of the seating portion frame 5, at least at the second width portion W7, is cantilevered relative to the first width portion W6, which could adversely affect its stability, or even result in damage to the seating portion frame 5 from the effect of the forces received.

Due to the connection mechanism 100 of the seat 1 according to the present disclosure, and as can be seen more particularly in the embodiments of FIGS. 1 and 6, the forces received by the seating portion frame 5 can be absorbed at its rear edge AR over substantially its entire width, along the transverse direction Y of the seat 1, partly by the at least one pivoting connection 52 of the connection system 51, and partly by the connection mechanism 100. No portion of the seating portion frame 5 is then cantilevered relative to another, which makes it possible to ensure its stability and reduces the risk of damage from the effect of the forces received.

According to one embodiment, the connection system 51 comprises a tab 53 formed on the seating portion frame 5, projecting from the rear edge AR of the seating portion frame 5, the tab 53 having two longitudinal ends E53, E53', with:

a first longitudinal end E53 integral to the seating portion frame 5 at the rear edge AR of the seating portion frame 5, and a second longitudinal end E53' connected to the first backrest 6 by means of the pivoting connection 52 along the fifth transverse axis Y2 of the seat 1.

Advantageously, and as can be seen in the exemplary embodiments of FIGS. 6, 7 and 8, the tab 53 is formed as one piece with and integral with the first side edge BL1 of the seating portion frame 5, and may be substantially rectilinear. The tab 53 may also be configured to extend substantially parallel to the first backrest 6 in its raised position.

As can be seen in the embodiments of FIGS. 1 and 6, the pivoting connection 52 may be positioned at a side flange 61 of the first backrest 6.

Advantageously, and so that the seating portion frame 5 does not have any portion that is cantilevered relative to another, at the first width portion W6, it may be arranged that:

the seating portion frame 5 has a central edge BC, substantially parallel to the first side edge BL1 and to the second side edge BL2 of the seating portion frame 5, and interposed between the first side edge BL1 and the second side edge BL2 in the transverse direction Y of the seat 1, and positioned so that the first width portion W6 extends substantially between the first side edge BL1 and the central edge BC of the seating portion frame 5 and that the second width portion W7 extends substantially between the central edge BC and the second side edge BL2 of the seating portion frame 5, and that the actuating mechanism 51 has two tabs 53, each projecting respectively from the first side edge BL1 and the central edge of the seating portion frame BC, defining the first width portion W6, the second longitudinal end E53' of the tabs 53 each being connected to the first backrest 6 by means of a separate pivoting connection 52 along the fifth transverse axis Y2 of the seat 1, each at a separate side flange 61 of the first backrest 6.

Advantageously, the two tabs 53 may be substantially identical and substantially parallel, in order to facilitate the manufacturing of the seating portion frame 5 of the seat 1 according to the present disclosure.

According to one embodiment, the first longitudinal end 102 of the connecting rod 101 of the connection mechanism 100 is hinged to the second side edge BL2 of the seating portion frame 5, and in particular defining, with the central edge BC, the second width portion W7.

Thus, due to this advantageous arrangement of the present disclosure, the seating portion frame 5 is held at its rear edge AR on the first side edge BL1 and on the second side edge BL2, which prevents part of the rear edge AR of the seating portion frame 5 from being cantilevered relative to another part, and increases its stability and reduces the risk of damage from the effect of the forces received.

This is further improved when the actuating mechanism 51 has two tabs 53, one at the first side edge BL1 and the other at the central edge BC of the seating portion frame 5, as described above.

According to one embodiment, the seat 1 further comprises locking means 62 configured to lock the tilt of the first backrest 6 relative to the base 4 about the first transverse axis Y1 of the seat 1.

Advantageously, and as visible in the exemplary embodiments of FIGS. 1 and 6, the pivoting connection along the first transverse axis Y1 of the seat 1 between the first backrest 6 and the base 4 may incorporate an electric actuator, configured to cause the first backrest 6 to pivot relative to the base 4 about the first transverse axis Y1 of the seat 1.

The locking means 62 may advantageously also be integrated into the pivoting connection along the first transverse axis Y1 of the seat 1 between the first backrest 6 and the base 4, or even into the electric actuator.

Additionally or alternatively, the locking means 62 may include a manually or electrically actuated lock, configured to lock the tilt of the first backrest 6 relative to the base 4 about the first transverse axis Y1, by creating a rigid connection between the first backrest 6 and the frame of the vehicle.

According to one embodiment, the lower frame 2 further provides connection means 3, configured to connect the lower frame 2 to the floor of the vehicle.

Advantageously, the connection means 3 comprise for example two sliders 31, arranged one on either side of the lower frame 2, each extending along a longitudinal axis X1, X2 of the seat 1, and configured to allow the translational movement of the seat 1 relative to the floor of the vehicle along the longitudinal direction X of the seat 1.

As is more particularly visible in the exemplary embodiments of FIGS. 1 and 6, each slider 31 may include a lower section 32, configured to be fixed to the floor of the vehicle by means of attachment means (not shown), the lower section 32 slidingly receiving an upper section 33.

According to one embodiment, the seating portion frame 5 is connected to the connection means 3 by means of at least one connecting rod 8 having two longitudinal ends 81, 82, wherein the first longitudinal end 81 of the connecting rod 8 is hinged to the connection means 3 so as to pivot about a sixth transverse axis Y3 of the seat and the second longitudinal end 82 of the connecting rod 8 is hinged to the seating portion frame 5, at its front edge AV, so as to pivot about a seventh transverse axis Y4 of the seat 1.

The rotation of the connecting rod 8 relative to the seating portion frame 5 and relative to the connection means 3, makes it possible to drive the movement of the front edge AV of the seating portion frame 5 relative to the connection means 3 and relative to the base 4, simultaneously along the longitudinal direction X and along the vertical direction Z.

In particular, the at least one connecting rod 8 may be part of the connection system 51 and cause the seating portion frame 5 to move relative to the floor of the vehicle, in the longitudinal direction X and the vertical direction Z of the seat 1, during the pivoting of the first backrest 6 relative to the base 4 about the first transverse axis Y1.

The connection rod 8 also makes it possible to connect the front edge AV of the seating portion frame 5 to the connection means 3, in order to allow absorption of the forces received by the seating portion frame 5, at its front edge AV, by the connection means 3.

Thus, the connecting rod 8 may be configured so that:

the forward pivoting of the first backrest 6 relative to the base 4 about the first transverse axis Y1 of the seat 1 between its at least one raised position and its folded position, causes the forward pivoting of the connecting rod 8 about the sixth transverse axis Y3 of the seat 1 so as to move the front edge AV of the seating portion frame 5 relative to the connection means 3, along the vertical direction Z of the seat 1, and vice versa, the rearward pivoting of the first backrest 6 relative to the base 4 about the first transverse axis Y1 of the seat 1 between its folded position and its at least one raised position, causes the rearward pivoting of the connecting rod 8 about the sixth transverse axis Y3 of the seat 1 so as to move the front edge AV of the seating portion frame 5 relative to the connection means 3, along the vertical direction Z of the seat.

The pivoting of the connecting rod 8 about each of the sixth and seventh transverse axes Y3 and Y4 of the seat 1 causes the seating portion frame 5 to move relative to the connection means 3 and to the base 4, and without causing movement of the second backrest 7 relative to the base 4, due to the connection mechanism 100.

As can be seen in the embodiments of FIGS. 1, 2, 3 and 6, the second longitudinal end 82 of the connecting rod 8 may be received on the first side edge BL1 or the second side edge BL2 of the seating portion frame 5, and as can be seen more particularly in the embodiment of FIGS. 1 and 2, two connecting rods 8 may be provided, each connecting the first side edge BL1, respectively the second side edge BL2, of the seating portion frame 5 to a separate connection means 3, and so as to ensure stability of the movement of the seating portion frame 5 relative to the connection means 3.

The two connecting rods 8 may be substantially identical and intended to move substantially in parallel.

At least a third connecting rod 8 could possibly be provided, for example with its second longitudinal end 82 connected to the central edge BC of the seating portion frame 5, and in particular substantially identical and intended to move substantially in parallel to the other two connecting rods 8.

According to one embodiment, the base 4 is mounted to be movable relative to the connection means 3 along the longitudinal direction X and the vertical direction Z of the seat 1, so as to be able to move closer to or away from the connection means 3.

The connection mechanism 100 may then be configured to allow movement of the base 4 relative to the seating portion frame 5 along the longitudinal direction X and the vertical direction Z of the seat 1 during the movement of the base 4 relative to the connection means 3 along the longitudinal direction X and the vertical direction Z of the seat 1, independently of and decoupled from the pivoting of the second backrest 7 relative to the base 4 about the second transverse axis Y1' of the seat 1.

The mobility of the base 4 relative to the connection means 3 along the longitudinal direction X and the vertical direction Z of the seat 1 makes it possible to increase the number of different configurations possible for the seat 1.

Figure 9:
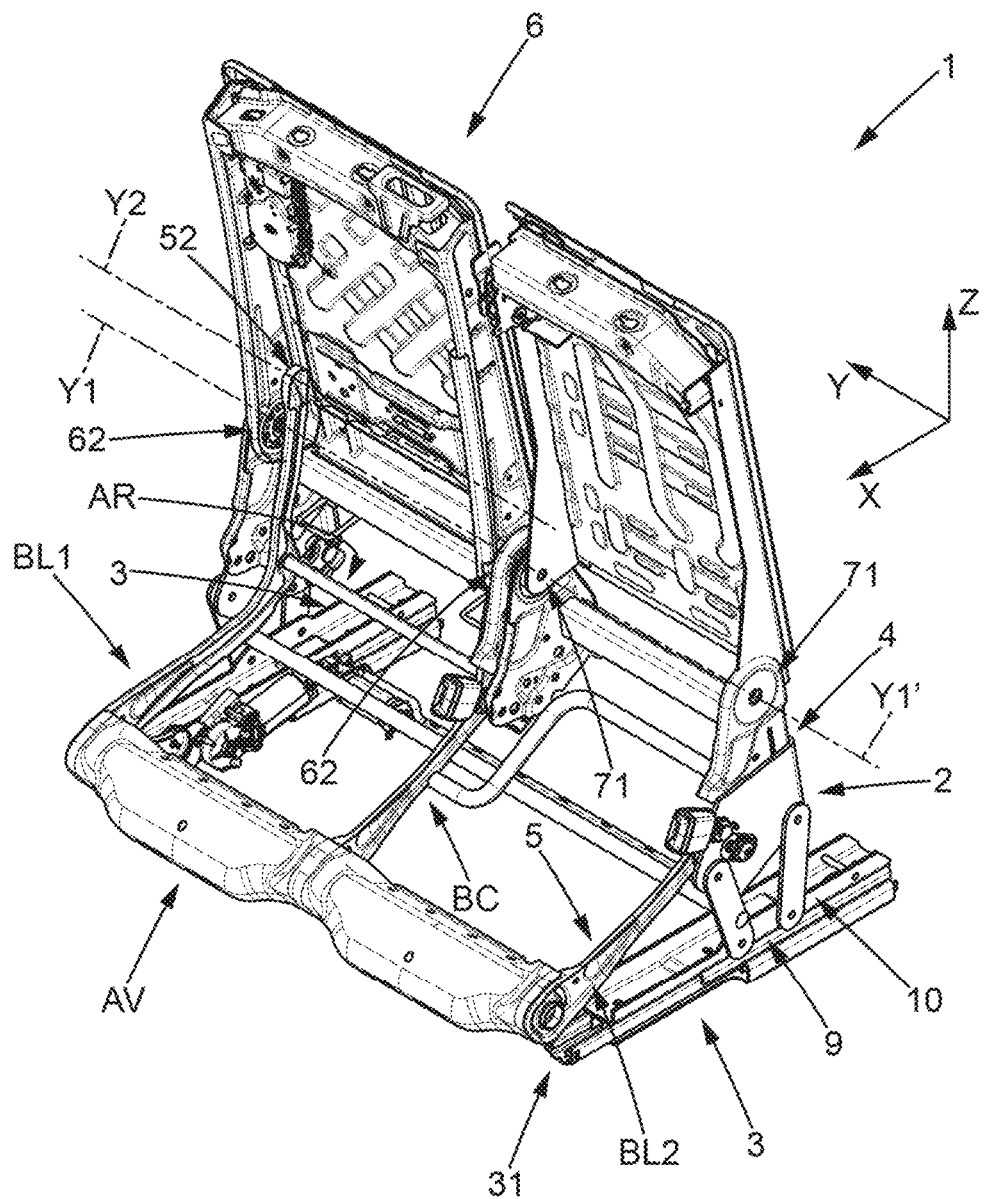
FIG. 9 shows a perspective view of the seat of FIG. 1, in a fifth configuration.

For example, as can be seen in the exemplary embodiment of FIG. 9, it is possible to envisage a so-called easy entry configuration, in which the base 4 is at a distance from the connection means 3, and therefore from the vehicle floor, in the vertical direction Z of the seat 1, with respect to the so-called nominal, single fold and dive down configurations, in which the base 4 may be adjoining the floor of the vehicle, and therefore the connection means 3, and the first backrest 6 is pivoted forward relative to the base 4 about the first transverse axis Y1, between its raised position and its folded position, so as to cause the movement, by means of the connection system 51, of the seating portion frame 5 towards its second position, similar to the one assumed in the dive down configuration, with its front edge AV flush with the floor of the vehicle, and therefore the connection means 3. The second backrest 7 may also be pivoted relative to the base 4 about the second transverse axis Y1', so as to be positioned between its raised position and its folded position, and in particular so as to remain substantially parallel to the first backrest 6.

The movement of the base 4 relative to the connection means 3 may be driven manually by a user or even by means of an actuator, for example an electric motor.

This so-called easy entry configuration makes it possible to free the space behind the seat 1, in particular to facilitate passage behind the seat 1, for example for users of the vehicle.

Figure 10:
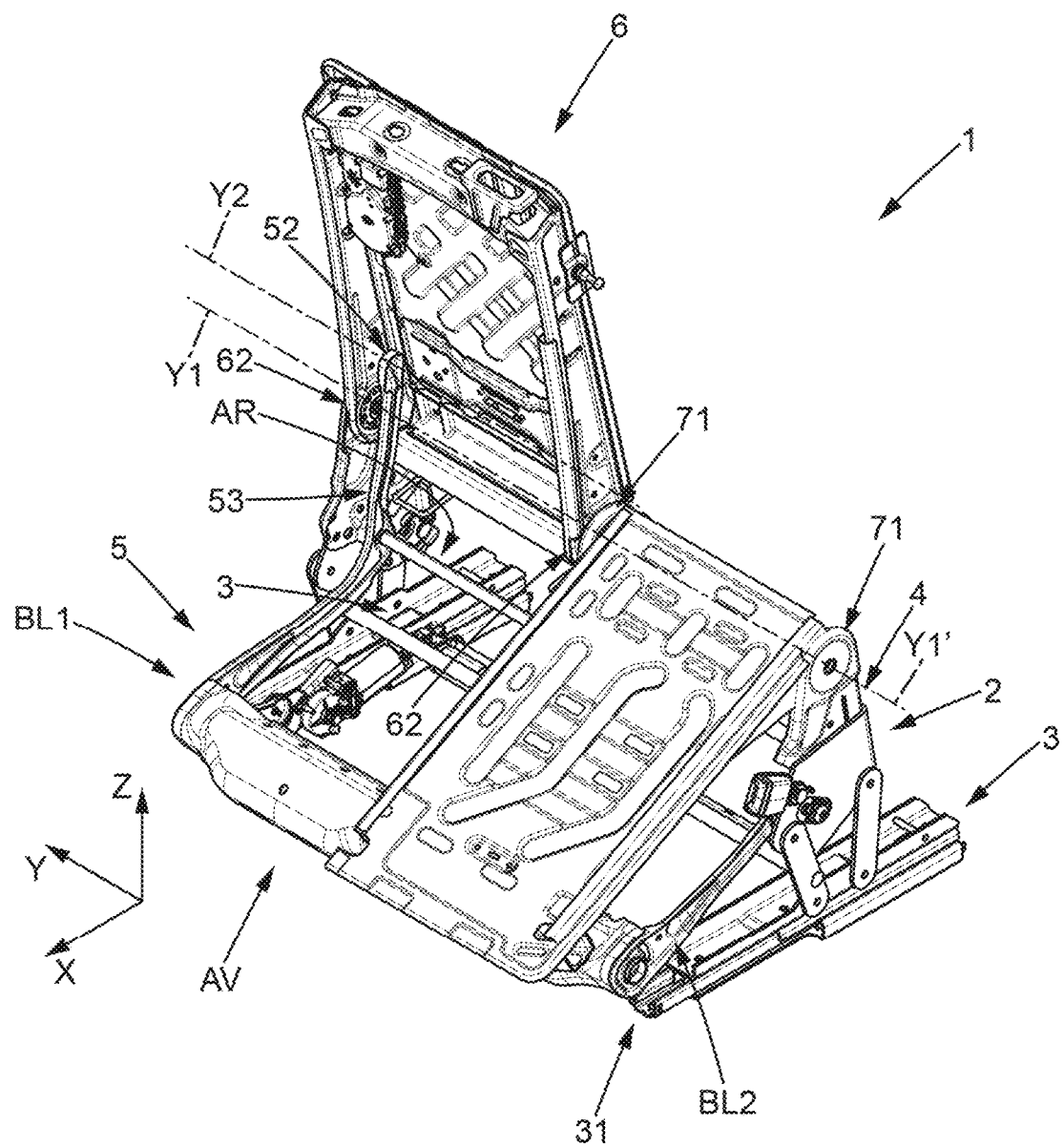
FIG. 10 shows a perspective view of the seat of FIG. 1, in a sixth configuration.

Also, as can be seen in the exemplary embodiment of FIG. 10, it is possible to envisage a so-called easy entry 2 configuration, similar to the easy entry configuration described above, in which the first backrest 6, the seating portion frame 5, and the base 4 are in a position similar to the one in the easy entry configuration, while the second backrest 7 is in its folded down position.

This so-called easy entry 2 configuration also makes it possible to free the space behind the seat 1 while maintaining an opening at the second backrest 7, for example for the passage of very long objects, as in the single fold configuration described above.

According to one embodiment, the base 4 is connected to the connection means 3 by at least two connecting rods 9, 10, aligned along a longitudinal axis X1, X2 of the seat 1, each connecting rod 9, 10 having two longitudinal ends 91, 92; 11, 12, wherein the first longitudinal end 91, 11 of each connecting rod 9, 10 is hinged to the connection means 3 so as to pivot respectively about an eighth transverse axis Y5 and a ninth transverse axis Y6 of the seat 1, and the second longitudinal end 92, 12 of each connecting rod 9, 10 is hinged to the base so as to pivot respectively about a tenth transverse axis Y7 and an eleventh transverse axis Y8 of the seat 1.

Advantageously, as can be seen in the exemplary embodiments of FIGS. 1, 2, 3 and 6, the connecting rods 9, 10 may be aligned with the connecting rod 8 connecting the seating portion frame 5 to the connection means 3.

Also, there may be provided two connecting rods 9, in particular substantially identical and intended to move substantially in parallel, each arranged respectively near the first side edge BL1 and the second side edge BL2 of the seating portion frame 5, and two connecting rods 10, in particular substantially identical and intended to move substantially in parallel, each arranged respectively near the first side edge BL1 and the second side edge BL2 of the seating portion frame 5.

There could also be provided at least a third connecting rod 9 and at least a third connecting rod 10, in particular substantially identical to the other connecting rods 9 and other connecting rods 10 and intended to move substantially in parallel to the other connecting rods 9 and the other connecting rods 10.

Advantageously, the first longitudinal end 81, 91, 11 of each connecting rod 8, 9 or 10 may be pivotally fixed on the upper section 33 of the slider 31.

The present disclosure also relates to a vehicle comprising a seat according to the present disclosure. The vehicle may in particular be a motor vehicle.

A vehicle may comprise at least one seat intended to accommodate a driver or a passenger of the vehicle, hereinafter referred to as a user. The seat may be intended to accommodate a single person or several people seated side by side, and may be arranged in the front or the rear of the vehicle. The seat may also be part of a bench seat that can accommodate several people side by side.

Within the meaning of the present disclosure, the term seat according to the present disclosure thus denotes a front seat of the vehicle as well as a rear seat of the vehicle. Likewise, the present disclosure can be implemented for seats intended for any type of vehicle and in particular for motor vehicles.

A vehicle seat may comprise a lower frame, configured to be connected to the floor of a vehicle, in particular with means for connecting to the floor of the vehicle, generally in the form of two sliders arranged one on either side of the lower frame, each extending along a longitudinal axis of the seat, configured to be fixed to the floor of the vehicle and to enable the seat to slide in the longitudinal direction of the seat.

The lower frame may also have a seating portion frame with a front edge and a rear edge connected to each other by a first side edge and a second side edge, configured to accommodate at least one user.

The lower frame may also have a base, configured to connect the lower frame to the vehicle floor, and in particular by means of the connection means, and positioned at the rear edge of the seating portion frame.

The seat may also comprise at least one backrest, hinged to the lower frame so as to pivot about a transverse axis of the seat, to enable adjusting its tilt relative to the lower frame.

Advantageously, the at least one backrest may be hinged to the base of the lower frame.

In the event that the seat is intended to accommodate at least two users, the seat may advantageously be provided with:

the seating portion frame of its lower frame comprising two seating areas to accommodate at least two users, and with a first backrest, a first hinged backrest pivoting on the base of the lower frame about a first transverse axis of the seat, extending along a first width portion of the seating portion frame in the transverse direction of the seat, and configured to pivot relative to the base about the first transverse axis between at least one raised position and a folded position, a second hinged backrest pivoting on the base of the lower frame about a second transverse axis of the seat, which may in particular be coincident with the first transverse axis, the second backrest extending along a second width portion of the seating portion frame in the transverse direction of the seat, and configured to pivot relative to the base about the second transverse axis between at least one raised position and a folded position.

Also, it may be desirable for the seating portion frame to be able to move relative to the base in the longitudinal direction and in the vertical direction of the seat.

Depending on the desired uses of the seat, different configurations of the seat may be provided. The different configurations correspond in particular to the different possible positions of the at least one backrest relative to the base, combined with the different possible positions of the seating portion frame relative to the base.

In order to facilitate the transition from one seat configuration to another, it is desirable in particular that the pivoting of the first backrest relative to the base about the first transverse axis of the seat causes a simultaneous movement of the seating portion frame relative to the base.

However, it may also be desirable to be able to benefit from seat configurations in which the first backrest is substantially in its raised position, while the second backrest is in its folded position.

There may therefore be provided a connection system connecting the first backrest to the seating portion frame, and in particular to the first width portion of the seating portion frame, configured so that the pivoting of the first backrest relative to the base about the first transverse axis between the at least one raised position and the folded position causes the simultaneous movement of the seating portion frame relative to the base in the longitudinal direction and the vertical direction between a first position and a second position, in both pivoting directions of the first backrest relative to the base, about the first transverse axis of the seat.

Advantageously, the second backrest may also be configured to pivot relative to the base about the second transverse axis, independently of the movement of the seating portion frame relative to the base in the longitudinal direction and the vertical direction, driven, by means of the connection system, by the pivoting of the first backrest relative to the base about the first transverse axis, at least to enable the second backrest to be folded from the at least one raised position to the folded position with the first backrest remaining in the raised position, and without causing the simultaneous movement of the seating portion frame relative to the base.

The connection system may in particular connect only the first backrest to the seating portion frame, and in particular to the first width portion of the seating portion frame, no connection then existing between the second backrest and the seating portion frame.

However, the forces received by the seating portion frame, and in particular at its rear edge, are therefore only absorbed via the connection system transmitting them to the first backrest, so that there is a risk of a portion of the seating portion frame, and in particular its rear edge at the second width portion, being cantilevered relative to the rest of the seating portion frame, and in particular the first width portion, which affects its stability and could damage the seating portion frame due to the effect of these received forces.

Thus, in order to be able to withstand the forces exerted on the seating portion frame, in particular at the second width portion of its rear edge, it may be advantageous for these to be absorbed by another element of the seat.

However, this absorption of the forces received at the rear edge of the seating portion frame, on the second width portion of the seating portion frame, for example by the base, must not prevent the movement of the seating portion frame relative to the base driven by the pivoting of the first backrest relative to the base.

The present disclosure overcomes the shortcomings of comparative vehicle seats by proposing such a vehicle seat configured to accommodate at least two users, able to assume different configurations, for which the forces received by the seating portion frame can be absorbed at its rear edge over its entire width, so as to improve its strength and stability.

Another object of the present disclosure is to provide such a vehicle seat that is of simple design and low production cost.

A vehicle seat is proposed that is configured to accommodate at least two users, comprising:

a lower frame, intended to be connected to the floor of a vehicle, for example by means of connection means comprising in particular sliders, having:

a base, intended to be connected to the floor of the vehicle, for example by means of connection means, and a seating portion frame, comprising at least two seating areas to accommodate at least two users, having a front edge and a rear edge interconnected by a first side edge and a second side edge, a first backrest hinged to the base of the lower frame about a first transverse axis of the seat, extending along a first width portion of the seating portion frame in the transverse direction of the seat, and configured to pivot relative to the base about the first transverse axis between at least one raised position and a folded position, a second backrest hinged to the base of the lower frame so as to pivot about a second transverse axis of the seat, able in particular to be coincident with the first transverse axis, the second backrest extending along a second width portion of the seating portion frame in the transverse direction of the seat, and configured to pivot relative to the base about the second transverse axis between at least one raised position and a folded position.

According to the present disclosure, the seat further comprises a connection system connecting the first backrest to the seating portion frame, configured so that the pivoting of the second backrest relative to the base about the first transverse axis between the at least one raised position and the folded position causes the simultaneous movement of the seating portion frame relative to the base in the longitudinal direction and the vertical direction between a first position and a second position, in the two pivoting directions of the first backrest relative to the base, about the first transverse axis of the seat.

According to the present disclosure, the second backrest is configured to pivot relative to the base about the second transverse axis between the at least one raised position and the folded position, independently of the movement of the seating portion frame relative to the base in the longitudinal direction and the vertical direction, driven, by means of the connection system, by the pivoting of the first backrest relative to the base about the first transverse axis, at least to enable the second backrest to be folded from the at least one raised position to the folded position with the second backrest remaining in the raised position, and without causing the simultaneous movement of the seating portion frame relative to the base.

According to the present disclosure, the second width portion of the seating portion frame is connected to the base, at the rear edge of the seating portion frame, by means of a connection mechanism, configured to enable movement of the seating portion frame relative to the base in the longitudinal direction and the vertical direction of the seat during the movement of the seating portion frame relative to the base in the longitudinal direction and the vertical direction of the seat.

According to the present disclosure, the connection mechanism comprises a connecting rod having two longitudinal ends with:

a first longitudinal end hinged to the seating portion frame at its rear edge so as to pivot about a third transverse axis of the seat, and a second longitudinal end hinged to the base so as to pivot about a fourth transverse axis of the seat and movable relative to the base so as to slide along a translation axis.

According to optional features of the present disclosure, taken alone or in combination:

the connection mechanism is configured so that, during movement of the seating portion frame relative to the base in the longitudinal direction and in the vertical direction of the seat, driven by the pivoting of the first backrest relative to the base about the first transverse axis:

the connecting rod pivots relative to the seating portion frame at its first longitudinal end, about the third transverse axis, the connecting rod pivots relative to the base at its second longitudinal end, about the fourth transverse axis, the second longitudinal end of the connecting rod slides relative to the base along the translation axis;

the first longitudinal end of the connecting rod is hinged to a side edge of the seating portion frame so as to pivot about the third transverse axis of the seat;

the sliding axis is contained in a plane parallel to the plane of the seat, and preferably inclined relative to the longitudinal direction and/or to the vertical direction of the seat, and the base has a hole oriented along the translation axis, and the second longitudinal end of the connecting rod is connected to the base by means of a guide pin, received in the hole and configured to slide in the hole along the translation axis;

the hole is of substantially rectangular or oblong shape, and the guide pin has a longitudinal slide-guiding portion received in the hole, the hole having a substantially rectangular cross-section;

the connection system between the first backrest and the seating portion frame comprises a pivoting connection along a fifth transverse axis of the seat, distinct from the first transverse hinging axis between the first backrest and the base, connecting the first backrest and the seating portion frame near its rear edge;

the connection system comprises a tab provided on the seating portion frame, projecting from the rear edge of the seating portion frame, the tab having two longitudinal ends, with:

a first longitudinal end integral to the seating portion frame at the rear edge of the seating portion frame, and a second longitudinal end connected to the first backrest by means of the pivoting connecting along the fifth transverse axis of the seat;

the first longitudinal end of the tab of the connection system is integral with the first side edge of the seating portion frame, and the first longitudinal end of the connecting rod of the connection mechanism is hinged to the second side edge of the seating portion frame, defining, with the central edge, the second width portion;

the lower frame further presents connection means, configured to connect the lower frame to the floor of the vehicle, comprising for example two sliders arranged one on either side of the lower frame, each extending along a longitudinal axis of the seat, and configured to allow the seat to move in translation relative to the floor of the vehicle in the longitudinal direction of the seat;

the seating portion frame is connected to the connection means by means of at least one connecting rod having two longitudinal ends, wherein the first longitudinal end of the connecting rod is hinged to the connection means so as to pivot about a sixth transverse axis of the seat and the second longitudinal end of the connecting rod is hinged to the seating portion frame, at its front edge, so as to pivot about a seventh transverse axis of the seat;

the base is mounted to be movable relative to the connection means in the longitudinal direction and the vertical direction of the seat, so as to be able to move closer to or away from the connection means, the connection mechanism being configured to allow movement of the base relative to the seating portion frame in the longitudinal direction and the vertical direction of the seat during movement of the base relative to the connection means in the longitudinal direction and the vertical direction of the seat, independently of and decoupled from the pivoting of the backrest relative to the base about the second transverse axis of the seat;

the base is connected to the connection means by means of at least two connecting rods, aligned along a longitudinal axis of the seat, each connecting rod having two longitudinal ends, the first longitudinal end of each connecting rod being hinged to the connection means so as to pivot respectively about an eighth transverse axis and a ninth transverse axis of the seat, and the second longitudinal end of each connecting rod being hinged to the base so as to pivot respectively about a tenth transverse axis and an eleventh transverse axis of the seat.

According to another aspect, a vehicle is provided comprising a seat according to the present disclosure.

The features set forth in the following paragraphs may optionally be implemented. They may be implemented independently of one another or in combination with one another.

Vehicle seat (1) configured to accommodate at least two users, comprising:

a base (4), and a seating portion frame (5) comprising at least two seating areas, a first and a second backrest (6, 7) which are pivotally hinged to the base (4), wherein the seat (1) further comprises a connection system (51) connecting the first backrest (6) to the seating portion frame (5), configured so that the pivoting of the first backrest (6) relative to the base (4) causes the simultaneous movement of the seating portion frame (5) relative to the base (4), and wherein the second width portion (W7) of the seating portion frame (5) is connected to the base (4), by means of a connection mechanism (100), configured to enable movement of the seating portion frame (5) relative to the base (4) during the movement of the seating portion frame (5) relative to the base (4).

Clause 1. A vehicle seat (1) configured to accommodate at least two users, comprising:

a lower frame (2), intended to be connected to the floor of a vehicle, for example by means of connection means (3) comprising in particular sliders (31), having:

a base (4), intended to be connected to the floor of the vehicle, for example by means of connection means (3) comprising in particular sliders (31), and a seating portion frame (5), comprising at least two user places to accommodate at least two users, having a front edge (AV) and a rear edge (AR) interconnected by a first side edge (BL1) and a second side edge (BL2), a first backrest (6) hinged to the base (4) of the lower frame (2) so as to pivot about a first transverse axis (Y1) of the seat (1), extending along a first width portion (W6) of the seating portion frame (5) in the transverse direction (Y) of the seat (1), and configured to pivot relative to the base (4) about the first transverse axis (Y1) between at least one raised position and a folded position, a second backrest (7) hinged to the base (4) of the lower frame (2) so as to pivot about a second transverse axis (Y1') of the seat (1), able in particular to be coincident with the first transverse axis (Y1), the second backrest (7) extending along a second width portion (W7) of the seating portion frame (5) in the transverse direction (Y) of the seat (1), and configured to pivot relative to the base (4) about the second transverse axis (Y1') between at least one raised position and a folded position, wherein the seat (1) further comprises a connection system (51) connecting the first backrest (6) to the seating portion frame (5), configured so that the pivoting of the first backrest (6) relative to the base (4) about the first transverse axis (Y1) between the at least one raised position and the folded position causes the simultaneous movement of the seating portion frame (5) relative to the base (4) in the longitudinal direction (X) and the vertical direction (Z) between a first position and a second position, in the two pivoting directions of the first backrest (6) relative to the base (4), about the first transverse axis (Y1) of the seat (1), wherein the second backrest (7) is configured to pivot relative to the base (4) about the second transverse axis (Y1') between the at least one raised position and the folded position, independently of the movement of the seating portion frame (5) relative to the base (4) in the longitudinal direction (X) and the vertical direction (Z), driven, by means of the connection system (51), by the pivoting of the first backrest (6) relative to the base (4) about the first transverse axis (Y1), at least to enable the second backrest (7) to be folded from the at least one raised position to the folded position with the first backrest (6) remaining in the raised position, and without causing the simultaneous movement of the seating portion frame (5) relative to the base (4), and wherein the second width portion (W7) of the seating portion frame (5) is connected to the base (4), at the rear edge (AR) of the seating portion frame (5), by means of a connection mechanism (100), configured to enable movement of the seating portion frame (5) relative to the base (4) in the longitudinal direction (X) and the vertical direction (Z) of the seat (1) during the movement of the seating portion frame (5) relative to the base (4) in the longitudinal direction (X) and the vertical direction (Z) of the seat (1), and wherein the connection mechanism (100) comprises a connecting rod (101) having two longitudinal ends (102, 103) with:

a first longitudinal end (102) hinged to the seating portion frame (5) at its rear edge (AR), so as to pivot about a third transverse axis (Y102) of the seat (1), and a second longitudinal end (103) hinged to the base (4) so as to pivot about a fourth transverse axis (Y103) of the seat (1) and movable relative to the base (4) so as to slide along a translation axis (A104).

Clause 2. The seat (1) according to clause 1, wherein the connection mechanism (100) is configured such that, during movement of the seating portion frame (5) relative to the base (4) in the longitudinal direction (X) and in the vertical direction (Z) of the seat (1), driven by the pivoting of the first backrest (6) relative to the base (4) about the first transverse axis (Y1):

the connecting rod (101) pivots relative to the seating portion frame (5) at its first longitudinal end (102), about the third transverse axis (Y102), the connecting rod (101) pivots relative to the base (4) at its second longitudinal end (103), about the fourth transverse axis (Y103), the second longitudinal end (103) of the connecting rod (101) slides relative to the base (4) along the translation axis (A104).

Clause 3. The seat (1) according to clause 1 or 2, wherein the first longitudinal end (102) of the connecting rod (101) is hinged to a side edge (BL1, BL2) of the seating portion frame (5) so as to pivot about the third transverse axis (Y102) of the seat (1).

Clause 4. The seat (1) according to one of clauses 1 to 3, wherein the sliding axis (A104) is contained in a plane parallel to the plane (XZ) of the seat (1), and preferably inclined relative to the longitudinal direction (X) and/or to the vertical direction (Z) of the seat (1), and wherein the base (4) has a hole (104) oriented along the translation axis (A104), and wherein the second longitudinal end (103) of the connecting rod (101) is connected to the base (4) by means of a guide pin (105), received in the hole (104) and configured to slide in the hole (104) along the translation axis (A104).

Clause 5. The seat (1) according to clause 4, wherein the hole (104) is of substantially rectangular or oblong shape, and wherein the guide pin (105) has a longitudinal slide-guiding portion (106) received in the hole (104), the hole (104) having a substantially rectangular cross-section.

Clause 6. The seat (1) according to one of clauses 1 to 5, wherein the connection system (51) between the first backrest (6) and the seating portion frame (5) comprises a pivoting connection (52) along a fifth transverse axis (Y2) of the seat (1), distinct from the first transverse hinging axis (Y1) between the first backrest (6) and the base (4), connecting the first backrest (6) and the seating portion frame (5) near its rear edge (AR).

Clause 7. The seat (1) according to clause 6, wherein the connection system (51) comprises a tab (53) provided on the seating portion frame (5), projecting from the rear edge (AR) of the seating portion frame (5), the tab (53) having two longitudinal ends (E53, E53'), with:

a first longitudinal end (E53) integral to the seating portion frame (5) at the rear edge (AR) of the seating portion frame (5), and a second longitudinal end (E53') connected to the first backrest (6) by means of the pivoting connection (52) along the fifth transverse axis (Y2) of the seat (1).

Clause 8. The seat (1) according to clause 7, wherein the first longitudinal end (E53) of the tab (53) of the connection system (51) is integral with the first side edge (BL1) of the seating portion frame (5), and the first longitudinal end (102) of the connecting rod (101) of the connection mechanism (100) is hinged to the second side edge (BL2) of the seating portion frame (5).

Clause 9. The seat (1) according to one of clauses 1 to 8, wherein the lower frame (2) further has connection means (3), configured to connect the lower frame (2) to the floor of the vehicle, comprising for example two sliders (31) arranged one on either side of the lower frame (2), each extending along a longitudinal axis (X1, X2) of the seat (1), and configured to enable the seat (1) to move in translation relative to the floor of the vehicle in the longitudinal direction (X) of the seat (1).

Clause 10. The seat (1) according to claim 9, wherein the seating portion frame (5) is connected to the connection means (3) by means of at least one connecting rod (8) having two longitudinal ends (81, 82), wherein the first longitudinal end (81) of the connecting rod (8) is hinged to the connection means (3) so as to pivot about a sixth transverse axis (Y3) of the seat (1) and the second longitudinal end (82) of the connecting rod (8) is hinged to the seating portion frame (5), at its front edge (AV), so as to pivot about a seventh transverse axis (Y4) of the seat (1).

Clause 11. The seat (1) according to one of clauses 9 or 10, wherein the base (4) is mounted to be movable relative to the connection means (3) along the longitudinal direction (X) and the vertical direction (Z) of the seat (1), so as to be able to move closer to or away from the connection means (3), and wherein the connection mechanism (100) is configured to allow movement of the base (4) relative to the seating portion frame (5) along the longitudinal direction (X) and the vertical direction (Z) of the seat (1) during movement of the base (4) relative to the connection means (3) along the longitudinal direction (X) and the vertical direction (Z) of the seat (1), independently of and decoupled from the pivoting of the backrest (7) relative to the base (4) about the second transverse axis (Y1') of the seat (1).

Clause 12. The seat (1) according to clause 11, wherein the base (4) is connected to the connection means (3) by means of at least two connecting rods (9, 10), aligned along a longitudinal axis (X1, X2) of the seat (1), each connecting rod (9, 10) having two longitudinal ends (91, 92; 11, 12), wherein the first longitudinal end (91, 11) of each connecting rod (9, 10) is hinged to the connection means (3) so as to pivot respectively about an eighth transverse axis (Y5) and a ninth transverse axis (Y6) of the seat (1), and the second longitudinal end (92, 12) of each connecting rod (9, 10) is hinged to the base (4) so as to pivot respectively about a tenth transverse axis (Y7) and an eleventh transverse axis (Y8) of the seat (1).

Clause 13. A vehicle comprising a seat (1) according to one of clauses 1 to 12.

The invention claimed is:

1. A vehicle seat configured to accommodate at least two users, the vehicle seat comprising:
    a lower frame, intended to be connected to the floor of a vehicle, having:
        a base, intended to be connected to the floor of the vehicle, and
        a seating portion frame, comprising at least two user places to accommodate at least two users, having a front edge and a rear edge interconnected by a first side edge and a second side edge,
    a first backrest hinged to the base of the lower frame so as to pivot about a first transverse axis of the seat, extending along a first width portion of the seating portion frame in the transverse direction of the seat, and configured to pivot relative to the base about the first transverse axis between at least one raised position and a folded position,
    a second backrest hinged to the base of the lower frame so as to pivot about a second transverse axis of the seat, the second backrest extending along a second width portion of the seating portion frame in the transverse direction of the seat, and configured to pivot relative to the base about the second transverse axis between at least one raised position and a folded position,
    wherein the seat further comprises a connection system connecting the first backrest to the seating portion frame and configured so that the pivoting of the first backrest relative to the base about the first transverse axis between the at least one raised position and the folded position causes the simultaneous movement of the seating portion frame relative to the base in the longitudinal direction and the vertical direction between a first position and a second position, in the two pivoting directions of the first backrest relative to the base, about the first transverse axis of the seat,
    wherein the second backrest is configured to pivot relative to the base about the second transverse axis between the at least one raised position and the folded position independently of the movement of the seating portion frame relative to the base in the longitudinal direction and the vertical direction, by the connection system throughout the pivoting of the first backrest relative to the base about the first transverse axis at least to enable the second backrest to be folded from the at least one raised position to the folded position with the first backrest remaining in the raised position and without causing the simultaneous movement of the seating portion frame relative to the base, and
    wherein the second width portion of the seating portion frame is connected to the base at the rear edge of the seating portion frame by a connection mechanism configured to enable movement of the seating portion frame relative to the base in the longitudinal direction and the vertical direction of the seat during the movement of the seating portion frame relative to the base in the longitudinal direction and the vertical direction of the seat, and
    wherein the connection mechanism comprises a connecting rod having two longitudinal ends with:
    a first longitudinal end hinged to the seating portion frame at its rear edge, so as to pivot about a third transverse axis of the seat, and a second longitudinal end hinged to the base so as to pivot about a fourth transverse axis of the seat and movable relative to the base so as to slide along a translation axis.

2. The seat of claim 1, wherein the connection mechanism is configured such that, during movement of the seating portion frame relative to the base in the longitudinal direction and in the vertical direction of the seat driven by the pivoting of the first backrest relative to the base about the first transverse axis:
    the connecting rod pivots relative to the seating portion frame at its first longitudinal end, about the third transverse axis,
    the connecting rod pivots relative to the base at its second longitudinal end, about the fourth transverse axis,
    the second longitudinal end of the connecting rod slides relative to the base along the translation axis.

3. The seat of claim 1, wherein the first longitudinal end of the connecting rod is hinged to a side edge of the seating portion frame so as to pivot about the third transverse axis of the seat.

4. The seat of claim 1, wherein the translation axis is contained in a plane parallel to a plane of the seat and is inclined relative to the longitudinal direction and/or to the vertical direction of the seat, and
    wherein the base has a hole oriented along the translation axis, and wherein the second longitudinal end of the connecting rod is connected to the base by a guide pin received in the hole and configured to slide in the hole along the translation axis.

5. The seat of claim 4, wherein the hole is of substantially rectangular or oblong shape, and
wherein the guide pin has a longitudinal slide-guiding portion received in the hole, the hole having a substantially rectangular cross-section.

6. The seat of claim 1, wherein the connection system between the first backrest and the seating portion frame comprises a pivoting connection along a fifth transverse axis of the seat distinct from the first transverse axis between the first backrest and the base, the pivoting connection connecting the first backrest and the seating portion frame near its rear edge.

7. The seat of claim 6, wherein the connection system comprises a tab provided on the seating portion frame, the tab projecting from the rear edge of the seating portion frame and having two longitudinal ends with:
a first longitudinal end integral to the seating portion frame at the rear edge of the seating portion frame, and
a second longitudinal end connected to the first backrest by means of the pivoting connection along the fifth transverse axis of the seat.

8. The seat of claim 7, wherein the first longitudinal end of the tab of the connection system is integral with the first side edge of the seating portion frame, and the first longitudinal end of the connecting rod of the connection mechanism is hinged to the second side edge of the seating portion frame.

9. The seat of claim 1, wherein the lower frame further has connection means configured to connect the lower frame to the floor of the vehicle, the connection means comprising two sliders arranged one on either side of the lower frame, each slider extending along a longitudinal axis of the seat and configured to enable the seat to move in translation relative to the floor of the vehicle in the longitudinal direction of the seat.

10. The seat of claim 9, wherein the seating portion frame is connected to the connection means by at least one connecting rod having first and second longitudinal ends, wherein the first longitudinal end of the connecting rod is hinged to the connection means so as to pivot about a sixth transverse axis of the seat and the second longitudinal end of the connecting rod is hinged to the seating portion frame, at its front edge, so as to pivot about a seventh transverse axis of the seat.

11. The seat of claim 9, wherein the base is mounted to be movable relative to the connection means along the longitudinal direction and the vertical direction of the seat so as to be able to move closer to or away from the connection means, and
wherein the connection mechanism is configured to allow movement of the base relative to the seating portion frame along the longitudinal direction and the vertical direction of the seat during movement of the base relative to the connection means along the longitudinal direction and the vertical direction of the seat independently of and decoupled from the pivoting of the backrest relative to the base about the second transverse axis of the seat.

12. The seat of claim 11, wherein the base is connected to the connection means by at least two connecting rods aligned along a longitudinal axis of the seat, each connecting rod having first and second longitudinal ends, wherein the first longitudinal end of each connecting rod is hinged to the connection means so as to pivot respectively about an eighth transverse axis and a ninth transverse axis of the seat, and the second longitudinal end of each connecting rod is hinged to the base so as to pivot respectively about a tenth transverse axis and an eleventh transverse axis of the seat.

13. A vehicle comprising the seat of claim 1.

* * * * *